United States Patent
Sahasrabudhe et al.

(10) Patent No.: US 10,922,176 B2
(45) Date of Patent: Feb. 16, 2021

(54) RECOVERY OF PARITY BASED STORAGE SYSTEMS

(71) Applicant: SEAGATE TECHNOLOGY LLC, Cupertino, CA (US)

(72) Inventors: Nachiket Sahasrabudhe, Pune (IN); Mandar Sawant, Pune (IN)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 12 days.

(21) Appl. No.: 15/964,432

(22) Filed: Apr. 27, 2018

(65) Prior Publication Data
US 2019/0065318 A1   Feb. 28, 2019

Related U.S. Application Data

(60) Provisional application No. 62/548,811, filed on Aug. 22, 2017.

(51) Int. Cl.
*G06F 11/00* (2006.01)
*G06F 11/10* (2006.01)

(52) U.S. Cl.
CPC ...... *G06F 11/1088* (2013.01); *G06F 11/1076* (2013.01); *G06F 11/1092* (2013.01)

(58) Field of Classification Search
CPC .... G06F 11/10; G06F 11/1076; G06F 11/108; G06F 11/1088; G06F 11/1092
See application file for complete search history.

(56) References Cited

U.S. PATENT DOCUMENTS

| | | | |
|---|---|---|---|
| 9,298,542 B2 * | 3/2016 | Peake | G06F 11/10 |
| 2017/0097875 A1 * | 4/2017 | Jess | G06F 11/2069 |
| 2018/0293134 A1 * | 10/2018 | Jin | H03M 13/3761 |
| 2018/0341549 A1 * | 11/2018 | Bolkhovitin | G06F 11/1068 |
| 2019/0114221 A1 * | 4/2019 | Jensen | G06F 11/1004 |

* cited by examiner

*Primary Examiner* — Marc Duncan
(74) *Attorney, Agent, or Firm* — Holzer Patel Drennan

(57) ABSTRACT

Systems and methods for recovery of parity based storage systems are described. In one embodiment, a group of nodes includes one or more storage nodes, and the one or more storage nodes include one or more storage containers. In one embodiment, the one or more storage containers include one or more data storage containers, one or more parity storage containers, or one or more spare storage containers, or any combination thereof. The system and methods include a hardware controller configured to identify a first failed storage container on a first storage node from the group of storage nodes, identify data associated with the first failed storage container on at least a second storage container on a second storage node from the plurality of storage nodes, and recover the data associated with the first failed storage container from at least the second storage container on the second storage node.

16 Claims, 6 Drawing Sheets

RECOVERY OF PARITY BASED STORAGE SYSTEMS

RELATED APPLICATIONS

This application claims the benefit of the filing date of U.S. Provisional Application No. 62/548,811, filed on 22 Aug. 2017, and entitled OPTIMIZED RECOVERY MECHANISM FOR PARITY-BASED STORAGE SYSTEMS IN A MULTI-NODE ENVIRONMENT, the disclosure of which is incorporated in its entirety by this reference.

SUMMARY present disclosure is directed to methods and systems for recovery of parity based storage systems. In some embodiments, the present systems and methods may recover data lost due to one or more storage containers failing.

A storage system for recovery of parity based storage systems is described. In one embodiment, the storage system device may include one or more storage drives and one or more hardware storage controllers and/or one or more hardware storage processors. In some embodiments, the storage system includes one or more storage nodes from a particular group of storage nodes and the one or more storage nodes include one or more storage containers. In one embodiment, the one or more storage containers include one or more data containers, one or more parity containers, or one or more spare containers, or any combination thereof. In some embodiments, the storage system may include a hardware controller configured to identify a first failed storage container on a first storage node from the group of storage nodes, identify data associated with the first failed storage container on at least a second storage container on a second storage node from the plurality of storage nodes, and recover the data associated with the first failed storage container from at least the second storage container on the second storage node.

In some cases, the recovery of the data associated with the first failed storage container may be based at least in part on a first parity container of the first storage node accumulated with a product of a first coefficient and the second storage container of the second storage node. In one embodiment, the hardware controller may be further configured to store the recovered data associated with the first failed storage container in a first spare container.

In one embodiment, the hardware controller may be further configured to identify a second failed storage container on a third storage node from the group of storage nodes. In one embodiment, the hardware controller may be further configured to identify data associated with the second failed storage container from the recovered data associated with the first failed storage container, and recover the data associated with the second failed storage container from at least the recovered data associated with the first failed storage container.

In some cases, the recovery of the second failed storage container may be based at least in part on a product of a second coefficient and the second storage container on the second storage node accumulated with a product of a third coefficient and the recovered data associated with the first failed storage container. In one embodiment, the hardware controller may be further configured to store the recovered data associated with the second failed storage container in a second spare container.

In some cases, the group of storage nodes may include a plurality of coefficients, the plurality of coefficients including the first coefficient, the second coefficient, and the third coefficient, wherein all of the plurality of coefficients are available on each of the storage nodes from the group of storage nodes. In some cases, each of the plurality of storage nodes may include at least one accumulator when a storage container associated with the group of storage nodes fails. In some cases, each of the plurality of storage nodes may include a total of X accumulators when there are a total of X storage container failures associated with the group of storage nodes. In some cases, X may be any positive integer.

An apparatus for recovery of parity based storage systems is also described. In one embodiment, the apparatus may include a processor, memory in electronic communication with the processor, and instructions stored in the memory, the instructions being executable by the processor to identify a first failed storage container on a first storage node from the group of storage nodes, identify data associated with the first failed storage container on at least a second storage container on a second storage node from the plurality of storage nodes, and recover the data associated with the first failed storage container from at least the second storage container on the second storage node.

A method for recovery of parity based storage systems is also described. In one embodiment, the method may include performing one or more operations for recovery of parity based storage systems.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, including their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components, including those having a dash and a second reference label, apply to other similar components. If only the first reference label is used in the specification, the description is applicable to any one of the similar components having the same first reference label irrespective of the second reference label.

DETAILED DESCRIPTION

The following relates generally to recovery of parity based storage systems. In one embodiment, the present systems and methods efficiently recover failed data in a multi-node setup. In one example, data may be distributed across containers (hosted by multiple nodes) and redundancy may be calculated over groups of containers in the form of parity. In one embodiment, each container belonging to the same group may be part of the same node. Alternatively, in some embodiments containers belonging to the same group may be part of multiple nodes where each node includes one or more containers from the group. In one embodiment, the number of failures that the present systems and methods support is the same as the number of parities calculated for the group. In one embodiment, when a recoverable number of failures occur, a first set of one or more nodes share data with a second set of one or more nodes configured to hold the recovered data. In one embodiment, the present systems and methods optimize inter-node communication, while avoiding redundant computation.

An example of a container may include at least one of a storage drive, multiple storage drives, an enclosure of multiple drives, a virtual storage drive generated from one or more storage drives, a database, cloud storage, a distributed data storage system, or any combination thereof. Examples of data stored in the containers may include at least one of user data, system data, parity data, spare data, or any combination thereof.

In one embodiment, the process of recovering one or more lost or failed containers is mathematically equivalent to solving a system of linear equations. In one embodiment, lost containers map to unknowns and surviving containers map to known variables. Since surviving containers are spread across available nodes, one or more nodes of the group communicate their data with one or more other nodes in the group configured to host the recovered one or more containers. In one embodiment, the present systems and methods optimizes network communications used to recover the lost containers.

In one embodiment, the present systems and methods avoid copying or re-computing lost data to recover lost parity. In some cases, to recover a lost parity container the present systems and methods use one or more of the data containers in the group. If there is a simultaneous failure of both the data and the parity container, the present systems and methods first recover the data of the failed data container and share this data with the node hosting the recovered parity. In some cases, the present systems and methods distribute computations in a way that avoids sharing recovered data (e.g., by copying or re-computing the data) in order to recover the lost parity.

Figure 1:
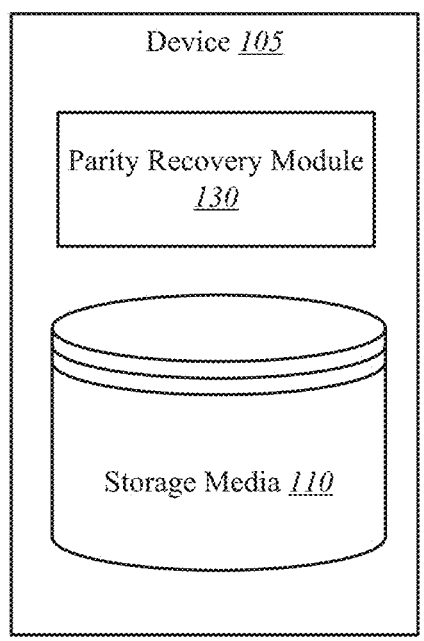
FIG. 1 is a block diagram of an example of a system in accordance with various embodiments.

FIG. 1 is a block diagram illustrating one embodiment of an environment 100 in which the present systems and methods may be implemented. The environment may include device 105 and storage media 110. The storage media 110 may include any combination of hard disk drives, solid state drives, and hybrid drives that include both hard disk and solid state drives. In some embodiment, the storage media 110 may include shingled magnetic recording (SMR) storage drives. In some embodiments, the systems and methods described herein may be performed on a single device such as device 105. In some cases, the methods described herein may be performed on multiple storage devices or a network of storage devices such as a cloud storage system and/or a distributed storage system. Examples of device 105 include a storage server, a storage enclosure, a storage controller, storage drives in a distributed storage system, storage drives on a cloud storage system, storage devices on personal computing devices, storage devices on a server, or any combination thereof. In some configurations, device 105 may include parity recovery module 130. In one example, the device 105 may be coupled to storage media 110. In some embodiments, device 105 and storage media 110 may be components of flash memory or a solid state drive and/or another type of storage drive. Alternatively, device 105 may be a component of a host of the storage media 110 such as an operating system, host hardware system, or any combination thereof.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, or any combination thereof. In one example, device 105 may be operable to receive data streams, store and/or process data, and/or transmit data from, to, or in conjunction with one or more local and/or remote computing devices.

The device 105 may include a database. In some cases, the database may be internal to device 105. In some embodiments, storage media 110 may include a database. Additionally, or alternatively, the database may include a connection to a wired and/or a wireless database. Additionally, as described in further detail herein, software and/or firmware (for example, stored in memory) may be executed on a processor of device 105. Such software and/or firmware executed on the processor may be operable to cause the device 105 to monitor, process, summarize, present, and/or send a signal associated with the operations described herein.

In some embodiments, storage media 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and cellular networks (using 3G and/or LTE, for example), or any combination thereof. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In one embodiment, the storage media 110 may be internal to device 105. As one example, device 105 may include a storage controller that interfaces with storage media of storage media 110. Parity recovery module 130 may perform one or more operations to recover parity based storage systems. In one embodiment, the parity recovery module 130 avoids copying or re-computing lost data to recover lost parity. In some cases, to recover a lost parity container, parity recovery module 130 uses one or more of the data containers in the group. When there is a simultaneous failure of both the data and the parity container, parity recovery module 130 recovers the data of the failed data container and shares this data with the node hosting the recovered parity. In some cases, parity recovery module 130 distributes computations in a way that avoids sharing recovered data (e.g., by copying or re-computing the data) in order to recover the lost parity.

Figure 2:
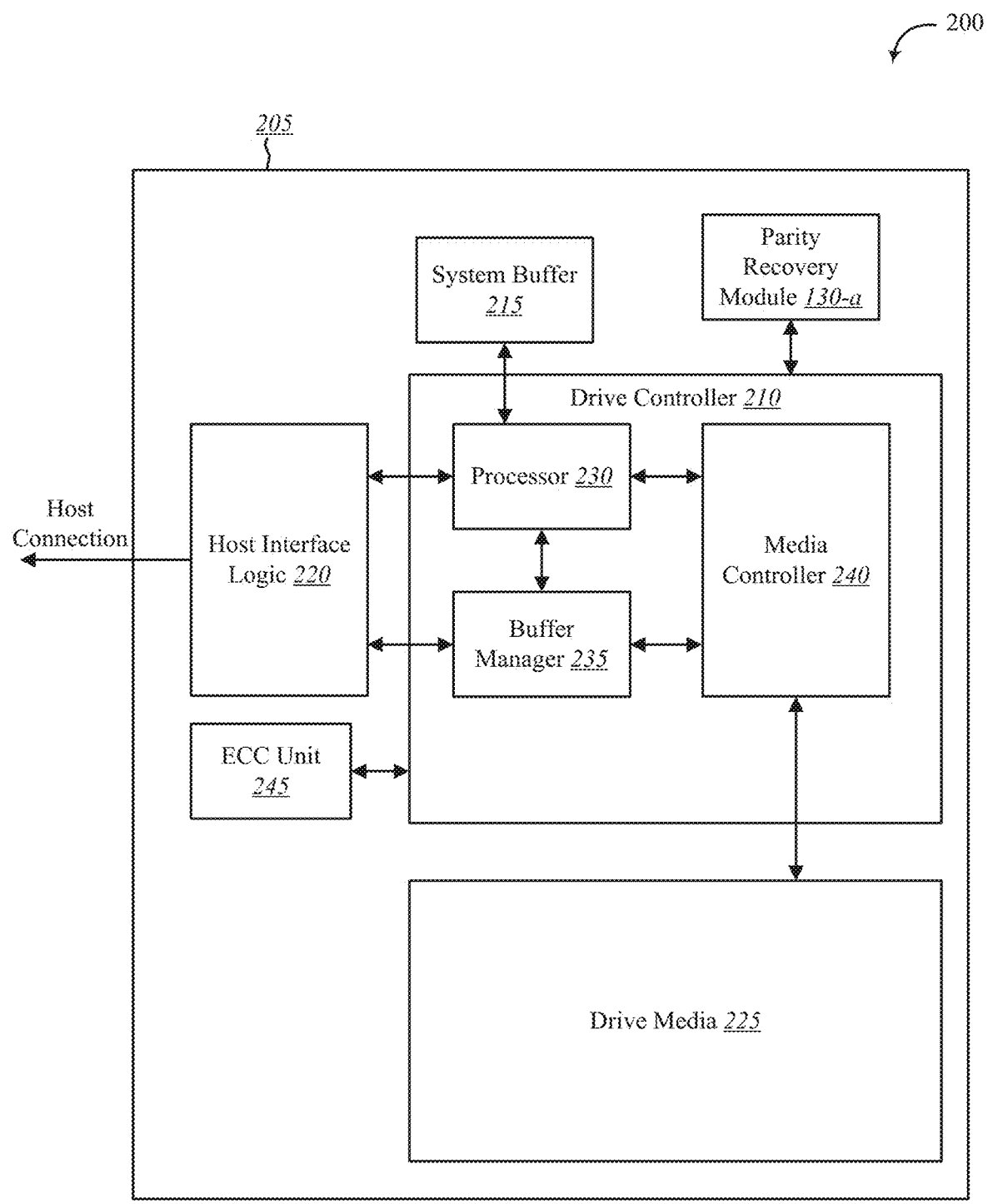
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, system buffer 215, host interface logic 220, drive media 225, and parity recovery module 130-a. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used such as Structured/Platform ASICs, Field Programmable Gate Arrays (FPGAs), and other Semi-Custom ICs, which may be programmed in any manner known in the art. The functions of each module may also be implemented, in whole or in part, with instructions embodied in memory formatted to be executed by one or more general and/or application-specific processors.

In one embodiment, the drive controller 210 may include a processor 230, a buffer manager 235, and a media controller 240. The drive controller 210 may process, via processor 230, read and write requests in conjunction with the host interface logic 220, the interface between the apparatus 205 and the host of apparatus 205. The system buffer 215 may hold data temporarily for internal operations of apparatus 205. For example, a host may send data to apparatus 205 with a request to store the data on the drive media 225. Drive media 225 may include one or more disk platters, flash memory, any other form of non-volatile memory, or any combination thereof. The drive controller 210 may process the request and store the received data in the drive media 225. In some cases, a portion of data stored in the drive media 225 may be copied to the system buffer 215 and the processor 230 may process or modify this copy of data and/or perform an operation in relation to this copy of data held temporarily in the system buffer 215. In some cases, ECC unit 245 may perform error correction on data stored in drive media 225.

In some embodiments, parity recovery module 130-a may include at least one of one or more processors, one or more memory devices, one or more storage devices, instructions executable by one or more processors stored in one or more memory devices and/or storage devices, or any combination thereof. Although depicted outside of drive controller 210, in some embodiments, parity recovery module 130-a may include software, firmware, and/or hardware located within drive controller 210 and/or operated in conjunction with drive controller 210. For example, parity recovery module 130-a may include at least a portion of processor 230, buffer manager 235, and/or media controller 240. In one example, parity recovery module 130-a may include one or more instructions executed by processor 230, buffer manager 235, and/or media controller 240.

Figure 3:
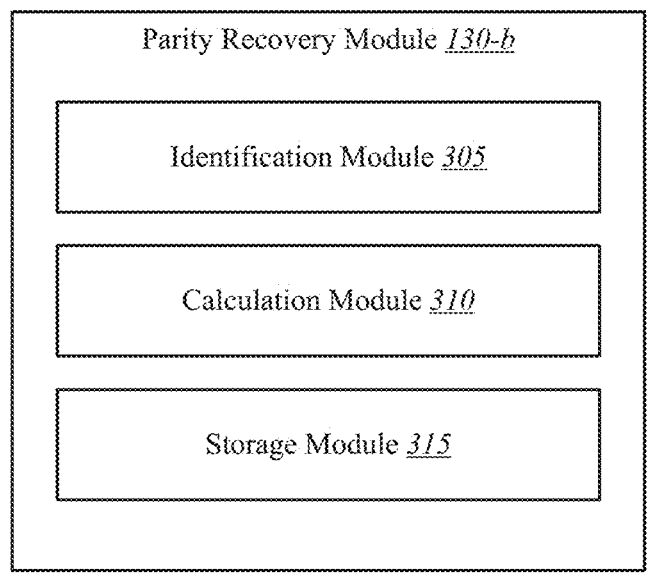
FIG. 3 shows a block diagram of one or more modules in accordance with various aspects of this disclosure.

FIG. 3 shows a block diagram of parity recovery module 130-b. The parity recovery module 130-b may include one or more processors, memory, and/or one or more storage devices. The parity recovery module 130-b may include identification module 305, calculation module 310, and storage module 315. The parity recovery module 130-b may be one example of parity recovery module 130 of FIGS. 1 and/or 2. Each of the components of parity recovery module 130-b may be in communication with each other.

In one embodiment, parity recovery module 130-b may include one or more hardware processors, memory, and/or storage to perform one or more operations described herein. In one example, parity recovery module 130-b may perform one or more operations in conjunction with one or more storage nodes of a particular group of storage nodes. For example, a first group may include a certain number of storage nodes and a second group may include the same number of storage nodes as the first group or a different number of storage nodes less or more than the first group.

In some examples, the one or more storage nodes may include one or more storage containers. In one embodiment, the one or more storage containers may include one or more data containers, one or more parity containers, or one or more spare containers, or any combination thereof. For example, a first storage container may include at least one data container and at least one spare container, a second storage container may include at least one data container and at least one parity container, while a third storage container may include at least one spare container and at least one parity container.

In one embodiment, identification module 305 may be configured to identify a first failed storage container on a first storage node from the group of storage nodes. In some embodiments, the first failed storage container may be the only storage container on the first storage node. Alternatively, the first failed storage container may be one of two or more storage containers on the first storage node. In some embodiments, identification module 305 may be configured to identify data associated with the first failed storage container on at least a second storage container on a second storage node from the plurality of storage nodes.

In one embodiment, calculation module 310 may be configured to perform one or more calculations to recover the data associated with the first failed storage container from at least the second storage container on the second storage node. In some cases, the recovery of the data associated with the first failed storage container may be based at least in part on a first parity container of the first storage node being accumulated with a product of a first coefficient and the second storage container of the second storage node. For example, calculation module 310 may accumulate a first parity container of the first storage node with a product of a first coefficient and the second storage container of the second storage node. In one embodiment, storage module 315 may be configured to store the recovered data associated with the first failed storage container in a first spare container.

In one embodiment, identification module 305 may be configured to identify a second failed storage container on a third storage node from the group of storage nodes. Alternatively, identification module 305 may identify a second failed storage container on the first storage node or the second storage node from the group of storage nodes. In some embodiments, the second failed storage container may be the only storage container on the third storage node. Alternatively, the second failed storage container may be one of two or more storage containers on the third storage node. In some embodiments, identification module 305 may be configured to identify data associated with the second failed storage container from the recovered data associated with the first failed storage container.

In one embodiment, calculation module 310 may be configured to perform one or more calculations to recover the data associated with the second failed storage container from at least the recovered data associated with the first failed storage container. In some cases, the recovery of the second failed storage container may be based at least in part on a product of a second coefficient and the second storage container on the second storage node accumulated with a product of a third coefficient and the recovered data associated with the first failed storage container. In one embodiment, storage module 315 may be configured to store the recovered data associated with the second failed storage container in a second spare container different from the first spare container. In one embodiment, a first storage node may include both the first spare container and the second spare container.

In some cases, the group of storage nodes may include a plurality of coefficients, the plurality of coefficients including the first coefficient, the second coefficient, and the third coefficient. In some cases, all of the plurality of coefficients may be available on each of the storage nodes from the group of storage nodes. In some examples, all of the data stored on the storage containers from the group of storage nodes is distributed across all of the storage containers. In one embodiment, not one of the storage nodes contains all of the data stored on the storage containers from the group of storage nodes.

In some cases, each of the plurality of storage nodes may include at least one accumulator when at least one storage container associated with the group of storage nodes fails. In some cases, each of the plurality of storage nodes may include a total of X accumulators when there are a total of X storage container failures associated with the group of storage nodes. In some cases, X may be any positive integer. For example, when a group of storage nodes included seven storage nodes, each storage node included three storage containers for a total of 21 storage containers, and three of the storage containers had failed, then each of the seven storage nodes may include three accumulators.

Figure 4:
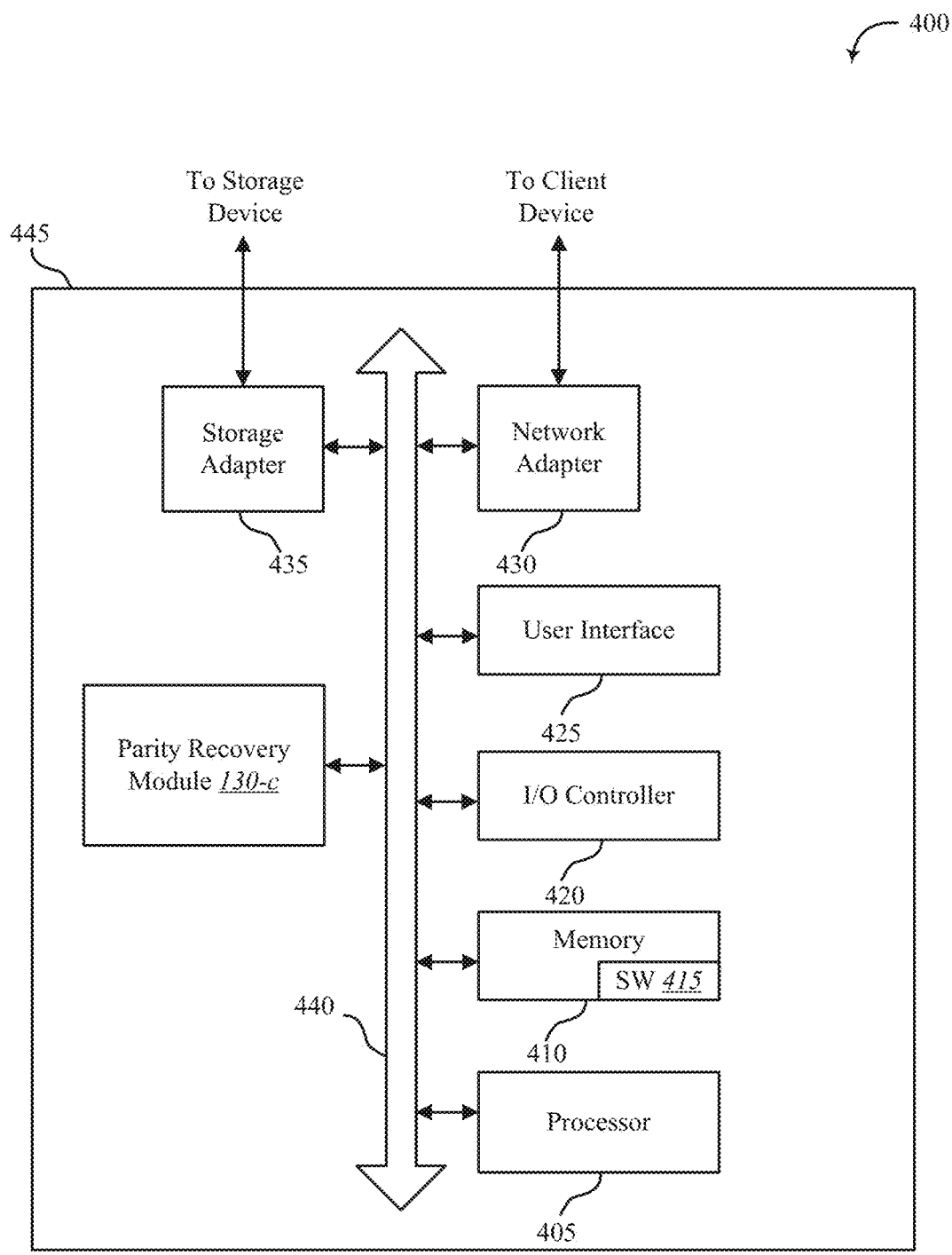
FIG. 4 shows a diagram of a system in accordance with various aspects of this disclosure.

FIG. 4 shows a system 400 for recovery of parity based storage systems, in accordance with various examples. System 400 may include an apparatus 445, which may be an example of any one of device 105 of FIG. 1 and/or apparatus 205 of FIG. 2.

Apparatus 445 may include components for bi-directional voice and data communications including components for transmitting communications and components for receiving communications. For example, apparatus 445 may communicate bi-directionally with one or more storage devices and/or client systems. This bi-directional communication may be direct (apparatus 445 communicating directly with a storage system, for example) and/or indirect (apparatus 445 communicating indirectly with a client device through a server, for example).

Apparatus 445 may also include a processor module 405, and memory 410 (including software/firmware code (SW) 415), an input/output controller module 420, a user interface module 425, a network adapter 430, and a storage adapter 435. The software/firmware code 415 may be one example of a software application executing on apparatus 445. The network adapter 430 may communicate bi-directionally, via one or more wired links and/or wireless links, with one or more networks and/or client devices. In some embodiments, network adapter 430 may provide a direct connection to a client device via a direct network link to the Internet via a POP (point of presence). In some embodiments, network adapter 430 of apparatus 445 may provide a connection using wireless techniques, including digital cellular telephone connection, Cellular Digital Packet Data (CDPD) connection, digital satellite data connection, and/or another connection. The apparatus 445 may include parity recovery module 130-c, which may perform the functions described above for the parity recovery module 130 of FIGS. 1, 2, and/or 3.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), or any combination thereof.

One or more buses 440 may allow data communication between one or more elements of apparatus 445 such as processor module 405, memory 410, I/O controller module 420, user interface module 425, network adapter 430, and storage adapter 435, or any combination thereof.

The memory 410 may include random access memory (RAM), read only memory (ROM), flash memory, and/or other types. The memory 410 may store computer-readable, computer-executable software/firmware code 415 including instructions that, when executed, cause the processor module 405 to perform various functions described in this disclosure. Alternatively, the software/firmware code 415 may not be directly executable by the processor module 405 but may cause a computer (when compiled and executed, for example) to perform functions described herein. Alternatively, the computer-readable, computer-executable software/firmware code 415 may not be directly executable by the processor module 405, but may be configured to cause a computer, when compiled and executed, to perform functions described herein. The processor module 405 may include an intelligent hardware device, for example, a central processing unit (CPU), a microcontroller, an application-specific integrated circuit (ASIC), field programmable gate array (FPGA), or any combination thereof.

In some embodiments, the memory 410 may contain, among other things, the Basic Input-Output system (BIOS) which may control basic hardware and/or software operation such as the interaction with peripheral components or devices. For example, at least a portion of the parity recovery module 130-c to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface such as network adapter 430.

Many other devices and/or subsystems may be connected to and/or included as one or more elements of system 400 (for example, a personal computing device, mobile computing device, smart phone, server, internet-connected device, cell radio module, or any combination thereof). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 445 with the ability to communicate with client devices such as device 105 of FIG. 1, and/or other devices over a communication network. Network adapter 430 may provide wired and/or wireless network connections. In some cases, network adapter 430 may include an Ethernet adapter or Fibre Channel adapter. Storage adapter 435 may enable apparatus 445 to access one or more data storage devices such as storage media 110. The one or more data storage devices may include two or more data tiers each. The storage adapter 435 may include one or more of an Ethernet adapter, a Fibre Channel adapter, Fibre Channel Protocol (FCP) adapter, a SCSI adapter, and iSCSI protocol adapter.

Figure 5:
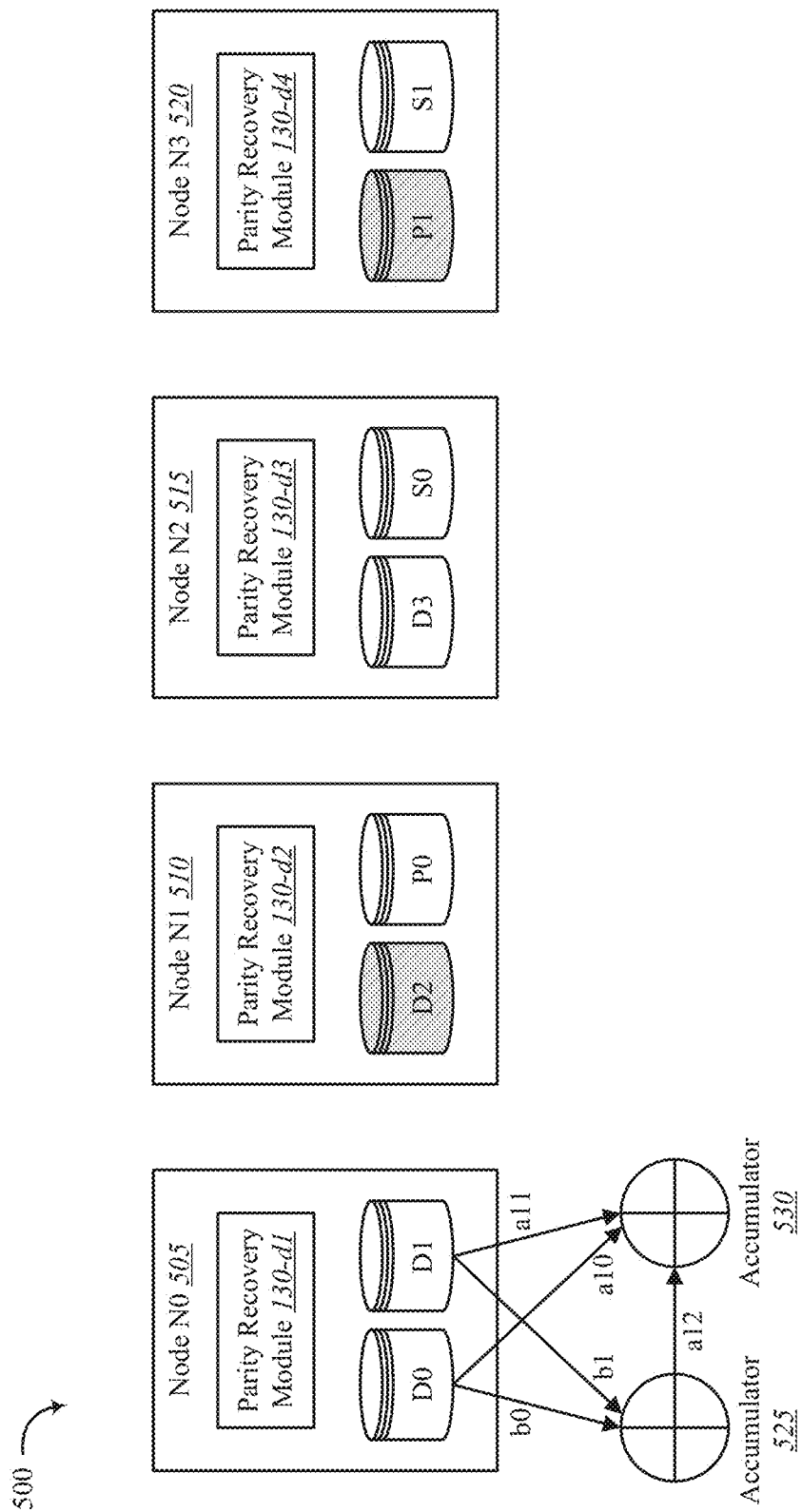
FIG. 5 shows one embodiment of an environment in accordance with various aspects of this disclosure.

FIG. 5 shows an environment 500 for recovery of parity based storage systems, in accordance with various examples. At least one aspect of environment 500 may be implemented in conjunction with device 105 of FIG. 1, apparatus 205 of FIG. 2, and/or parity recovery module 130 depicted in FIGS. 1, 2, 3, and/or 4.

As depicted, environment 500 may include at least four nodes: node N0 505, node N1 510, node N2 515, and node N3 520. At least one of the nodes 505-520 may be an example of device 105 of FIG. 1, apparatus 205 of FIG. 2, and/or apparatus 445 of FIG. 4.

As illustrated, each node 505-520 may include a parity recovery module 130. Additionally, each node 505-520 may host at least two storage containers. For example, node N0 505 may host data container D0 and data container D1, node N1 510 may host data container D2 and parity container P0, node N2 515 may host data container D3 and spare container S0, and node N3 520 may host parity container P1 and spare container S1.

In one embodiment, these 8 containers form a group that is self-sufficient in the event of data failure. In one embodiment, the number of groups with which a container can be a member is not restricted. In one embodiment, data and parity members of a group are related with a set of linear equations of the form as shown below in equations 1 and 2:

$$a_{00}*D_0+a_{01}*D_1+a_{02}*D_2+a_{03}*D_3=P_0 \quad \text{(Eq. 1)}$$

$$a_{10}*D_0+a_{11}*D_1+a_{12}*D_2+a_{13}*D_3=P_1 \quad \text{(Eq. 2)}$$

In some embodiments, all coefficients (e.g., $a_{00}$, $a_{01}$, $a_{02}$, $a_{03}$, etc.) are available on all four nodes, but only selective data is available on a per node basis. In a failure case when D2 fails, the present systems and methods may recalculate Eq. 1 to get the following:

$$D_2 = \frac{1}{a_{02}}*P_0 - \left(\frac{a_{00}}{a_{02}}*D_0 + \frac{a_{01}}{a_{02}}*D_1 + \frac{a_{03}}{a_{02}}*D_3\right) \quad \text{(Eq. 3)}$$

In one embodiment, D2 recovered based on Eq. 3 may be stored in S0 on node N2. To recover P1, the present systems and methods may use Eq. 2. In one embodiment, each node communicates its data with N2. On N2, the present systems and methods then compute D2 using Eq. 3. N2 shares D2 with N3, which then calculates P1 using Eq. 2. Alternatively, all nodes may share their data with both N2 and N3. Both N2 and N3 independently may calculate D2. N3 then uses this locally calculated D2 to calculate P1. In general, if there are D data containers and K parity containers, and if there are K failures, then both of the above schemes will have communication of complexity O(D), using big O notation. In some cases, big O notation may be used to classify algorithms according to how their running time or space requirements grow as the input size grows. In analytic number theory, big O notation may be used to express a bound on the difference between an arithmetical function and a better understood approximation. In some cases, big O notation may characterize functions according to their growth rates. In some cases, different functions with the same growth rate may be represented using the same O notation. The letter O may be used because the growth rate of a function may be referred to as "order of the function." A description of a function in terms of big O notation may provide an upper bound on the growth rate of the function.

In typical usage, the formal definition of O notation is not used directly, rather, the O notation for a function f is derived by following simplification rules. A first rule may include: If f(x) is a sum of several terms and one term has the largest growth rate, the term with the largest growth rate is kept, while all other terms are omitted. A second rule may include: If f(x) is a product of several factors, any constants (terms in the product that do not depend on x) are omitted. As one example, the equation $f(x)=6x^4-2x^3+5$ may be simplified using O notation to describe its growth rate as x approaches infinity. The exemplary function is the sum of three terms: $6x^4$, $-2x^3$, and 5. Of these three terms, the one with the highest growth rate is the one with the largest exponent as a function of x, namely $6x^4$. Now one may apply the second rule: $6x^4$ is a product of 6 and $x^4$ in which the first factor does not depend on x. Omitting the "6" factor results in the simplified form $x^4$. Thus, we say that f(x) is a "big-oh" of ($x^4$). Mathematically, we can write $f(x)=O(x^4)$. One may confirm this calculation using the formal definition: let $f(x)=6x^4-2x^3+5$ and $g(x)=x^4$.

In one embodiment, when there are N number of nodes in the system, then there are two cases: N<D, and D<N. In the case of N<D, the best communication complexity one can achieve is O(N). In the case of D<N, the best complexity is O(D). In one embodiment, the present systems and methods include a process that operates at the communication complexity of O(min(N, D)), on a per group basis and reduces redundant computation and possible implementation complexity that may arise when a destination of failed data needs to share recovered data with the destination for failed parity. This implementation complexity arises because the recovery algorithm does not remain the same for the possible failure patterns of (a) all failed members are data; (b) all failed members are parity; and (c) failed members are combination of data and parity. In one embodiment, case (c) includes separate treatment, sharing recovered data with the destination node for parity.

In one embodiment, the present systems and methods use one or more accumulators in relation to failures. As one example, in the present systems and methods each node may maintain one accumulator per failure per group of which the node is a member. In one embodiment, the maximum number of accumulators per node per group can be K when there are K failures. In one embodiment, instead of sending local data to the respective destination node for a failed member of the group, each node calculates the contribution of the local data towards the failed member(s) and adds that contribution to the respective accumulator. Thus, in one embodiment in which D2 and P1 both fail, a first node (N0) may calculate:

$$D_2(N_0) = -\frac{a_{00}}{a_{02}} * D_0 - \frac{a_{01}}{a_{02}} * D_1 \quad \text{(Eq. 4)}$$

$$P_1(N_0) = a_{10} * D_0 + a_{11} * D_1 + a_{12} * D_2(N_0) \quad \text{(Eq. 5)}$$

In one example, the left hand side (LHS) of both Eq. 4 and Eq. 5 may represent accumulators for respective failed group members on node N0. Once calculated, N0 may send $D_2(N_0)$ to N2 and $P_1(N_0)$ to N3, where N2 and N3 respectively add these received accumulators of N0 to their own local accumulators for the failed data. When N2 has received all accumulators from other nodes, it may calculate the result of Eq. 3. When N3 receives accumulators from all other nodes, it may calculate Eq. 2.

In the case of N<D, irrespective of locally available units, each node may share only one accumulator with the destination node of the failed member. In some cases, communication is of O(N), in the worst case for the case of N<D. In the case of D<N, nodes participating in recovery may not be more than D in this case, as for every group there exists at least one node which is not member of the group. In the case of N<D, the worst case complexity of communication is of O(D).

Observing the last term of Eq. 5, in some cases, the partial result for D2 obtained at N0 may be used to calculate the partial result for P1. This eliminates the need to calculate D2 separately on N3 or the need of N2 to communicate D2 with N3, because the partial result of P1 at each node contains a partial contribution from D2. When all partial results are added at N3, the entire contribution from D2 towards P1 is obtained.

In some cases, the illustrated containers hold data, parity of an associated group, or spare data. In the illustrated example, data containers D0, D1, D2, and D3 mark the data of the group, while P0 and P1 indicate the parity calculated over the data of the group in data containers D0, D1, D2, and D3. The failed data will be recovered on containers holding spares of the group, S0 and S1, in this case. In the illustrated example, D2 and P1 are marked failed and their recovery is mapped to the spares S0 and S1 respectively. In one embodiment, parity recovery module 130-d1 performs one or more calculations to recover D2 and P1. For example, parity recovery module 130-d1 may perform one or more equations. As one example, parity recovery module 130-d1 may solve equations Eq. 6 and Eq. 7, shown below, distributively across the nodes 505-520:

$$D_2 = b_0 * D_0 + b_1 * D_1 + b_3 * D_3 + P_0 \quad \text{(Eq. 6)}$$

$$P_1 = a_{10} * D_0 + a_{11} * D_1 + a_{12} * D_2 + a_{13} * D_3 \quad \text{(Eq. 7)}$$

As illustrated in FIG. 5, multiplicative coefficients associated with each respective container are illustrated next to respective arrows (e.g., b0, b1, a10, a11, a12). In some embodiments, similar operations as illustrated in FIG. 5 may be performed with respect to one or more of the other nodes 510, 515, and/or 520. In some embodiments, parity recovery module 130-d1 may perform one or more operations in conjunction with accumulator 525 and accumulator 530. In some cases, parity recovery module 130-d1 may include accumulator 525 and accumulator 530. In some cases, accumulator 525 and accumulator 530 may be separate from parity recovery module 130-d1. In some cases, accumulator 525 may be an accumulator for failed data container D2 and accumulator 530 may be an accumulator for failed parity container P1.

In one embodiment, in conjunction with parity recovery module 130-d1, accumulator 525 accumulates D2 with the product of b0 and D0, and the product of b and D1, and parity recovery module 130-d1 sends D2 from accumulator 525 to parity recovery module 130-d3. In some embodiments, parity recovery module 130-d3 may accumulate results from accumulators from all relevant nodes and store the accumulated result on S0. In one embodiment, in conjunction with parity recovery module 130-d1, accumulator 530 accumulates the product of a10 and D0, the product of a11 and D1, the product of a12 and D2 from accumulator 525, and parity recovery module 130-d1 sends P1 from accumulator 530 to parity recovery module 130-d4.

In one embodiment, the arithmetic operations of equations 1, 2, 3, 4, 5, 6, and/or 7 above may not be restricted to real numbers. In some cases, equations 1, 2, 3, 4, 5, 6, and/or 7 may be applicable to any field (e.g., finite or infinite). In case of finite fields, at least a part of the operations of equations 1, 2, 3, 4, 5, 6, and/or 7 may be performed in conjunction with a lookup table.

Figure 6:
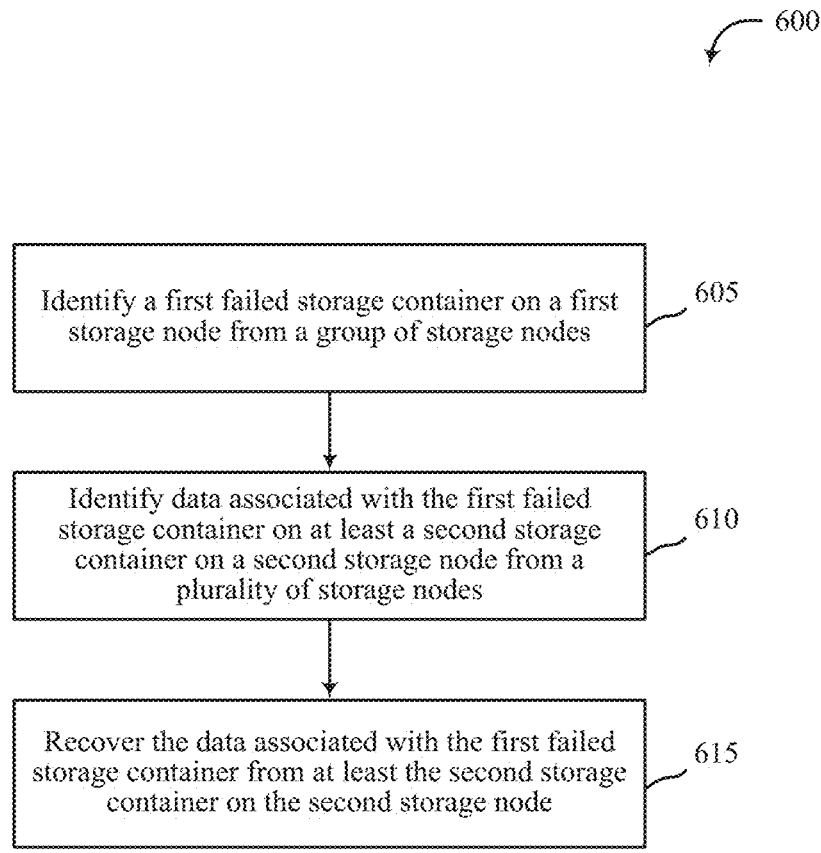
FIG. 6 is a flow chart illustrating an example of a method in accordance with various aspects of this disclosure.

FIG. 6 is a flow chart illustrating an example of a method 600 for internal copy-back with read-verify, in accordance with various aspects of the present disclosure. One or more aspects of the method 600 may be implemented in conjunction with device 105 of FIG. 1, apparatus 205 of FIG. 2, and/or parity recovery module 130 depicted in FIGS. 1, 2, 3, 4, and/or 5. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, the method 600 may include identifying a first failed storage container on a first storage node from a group of storage nodes. At block 610, the method 600 may include identifying data associated with the first failed storage container on at least a second storage container on a second storage node from a plurality of storage nodes. At block 615, the method 600 may include recovering the data associated with the first failed storage container from at least the second storage container on the second storage node.

The operations at blocks 605-615 may be performed using the parity recovery module 130 described with reference to FIGS. 1-5 and/or another module. Thus, the method 600 may provide for internal copy-back with read-verify. It should be noted that the method 600 is just one implementation and that the operations of the method 600 may be rearranged, omitted, and/or otherwise modified such that other implementations are possible and contemplated.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, for example, a combination of a DSP and a microprocessor, multiple microprocessors, one or more microprocessors in conjunction with a DSP core, and/or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, or any combination thereof, then the coaxial cable, fiber optic cable, twisted pair, DSL, or wireless technologies such as infrared, radio, and/or microwave are included in the definition of medium. Disk and disc, as used herein, include any combination of compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage system comprising:
   a plurality of storage nodes in a group of storage nodes, each storage node including one or more storage containers, the one or more storage containers including one or more data containers, one or more parity containers, or one or more spare containers, or any combination thereof; and
   a hardware controller configured to:
   identify a first failed storage container on a first storage node from the group of storage nodes, identify data associated with the first failed storage container on at least a second storage container on a second storage node from the plurality of storage nodes, and recover the data associated with the first failed storage container from at least the second storage container on the second storage node, wherein recovery of the data associated with the first failed storage container is based at least in part on a first parity container of the first storage node; and
   identify data associated with a second failed storage container on a third storage node from the group of storage nodes from the recovered data associated with the first failed storage container, and recover the data associated with the second failed storage container from at least the recovered data associated with the first failed storage container.

2. The storage system of claim 1, wherein the recovery of the data associated with the first failed storage container is based at least in part on the first parity container of the first storage node accumulated with a product of a first coefficient and the second storage container of the second storage node.

3. The storage system of claim 2, wherein the hardware controller is further configured to:
   store the recovered data associated with the first failed storage container in a first spare container.

4. The storage system of claim 1, wherein the recovery of the second failed storage container is based at least in part on a product of a second coefficient and the second storage container on the second storage node accumulated with a product of a third coefficient and the recovered data associated with the first failed storage container.

5. The storage system of claim 4, wherein the hardware controller is further configured to:
   store the recovered data associated with the second failed storage container in a second spare container.

6. The storage system of claim 4, wherein the group of storage nodes includes a plurality of coefficients, the plurality of coefficients including the first coefficient, the second coefficient, and the third coefficient, wherein all of the plurality of coefficients are available on each of storage node from the group of storage nodes.

7. The storage system of claim 1, wherein each of the plurality of storage nodes includes at least one accumulator when a storage container associated with the group of storage nodes fails.

8. The storage system of claim 1, wherein each of the plurality of storage nodes includes a total of X accumulators when there are a total of X storage container failures associated with the group of storage nodes, X being any positive integer.

9. An apparatus comprising:
   a plurality of storage nodes in a group of storage nodes, each storage node including one or more storage containers, the one or more storage containers including one or more data containers, one or more parity containers, or one or more spare containers, or any combination thereof; and
   one or more processors configured to:
   identify a first failed storage container on a first storage node from the group of storage nodes, identify data associated with the first failed storage container on at least a second storage container on a second storage node from the plurality of storage nodes, and recover the data associated with the first failed storage container from at least the second storage container on the second storage node, wherein recovery of the data associated with the first failed storage container is based at least in part on a first parity container of the first storage node; and
   identify data associated with a second failed storage container on a third storage node from the group of storage nodes from the recovered data associated with the first failed storage container, and recover the data associated with the second failed storage container from at least the recovered data associated with the first failed storage container.

10. The apparatus of claim 9, wherein the recovery of the data associated with the first failed storage container is based at least in part on the first parity container of the first storage node accumulated with a product of a first coefficient and the second storage container of the second storage node.

11. The apparatus of claim 10, wherein the one or more processors are further configured to:
    store the recovered data associated with the first failed storage container in a first spare container.

12. The apparatus of claim 9, wherein the recovery of the second failed storage container is based at least in part on a product of a second coefficient and the second storage container on the second storage node accumulated with a product of a third coefficient and the recovered data associated with the first failed storage container.

13. The apparatus of claim 12, wherein the one or more processors are further configured to:
    store the recovered data associated with the second failed storage container in a second spare container.

14. The apparatus of claim 12, wherein the group of storage nodes includes a plurality of coefficients, the plurality of coefficients including the first coefficient, the second coefficient, and the third coefficient, wherein all of the plurality of coefficients are available on each of storage node from the group of storage nodes.

15. A method comprising:
    identifying a first failed storage container on a first storage node from a group of storage nodes;
    identifying data associated with the first failed storage container on at least a second storage container on a second storage node from a plurality of storage nodes;
    recovering the data associated with the first failed storage container from at least the second storage container on the second storage node, wherein recovery of the data associated with the first failed storage container is based at least in part on a first parity container of the first storage node accumulated with a product of a first coefficient and the second storage container of the second storage node; and identifying data associated with a second failed storage container on a third storage node from the group of storage nodes from the recovered data associated with the first failed storage container, and recover the data associated with the second failed storage container from at least the recovered data associated with the first failed storage container.

16. The method of claim 15, wherein the group of storage nodes comprises the plurality of storage nodes, each storage node including one or more storage containers, the one or more storage containers comprising one or more data containers, one or more parity containers, or one or more spare containers, or any combination thereof.

* * * * *